(12) United States Patent
Morita et al.

(10) Patent No.: US 8,173,029 B2
(45) Date of Patent: May 8, 2012

(54) MAGNETIC RECORDING MEDIUM MANUFACTURING METHOD

(75) Inventors: Seiji Morita, Yokohama (JP); Shinobu Sugimura, Yokohama (JP); Kazuyo Umezawa, Yokohama (JP); Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 70 days.

(21) Appl. No.: 12/725,403

(22) Filed: Mar. 16, 2010

(65) Prior Publication Data
US 2010/0237041 A1 Sep. 23, 2010

(30) Foreign Application Priority Data
Mar. 18, 2009 (JP) ................................. 2009-066643

(51) Int. Cl.
*B44C 1/22* (2006.01)
(52) U.S. Cl. ................ 216/22; 216/41; 216/47; 216/58; 430/269; 264/293
(58) Field of Classification Search .................... 216/22, 216/41, 47, 58; 430/269; 264/293
See application file for complete search history.

(56) References Cited

U.S. PATENT DOCUMENTS

| | | | |
|---|---|---|---|
| 4,832,992 A | 5/1989 | Yabe et al. | |
| 5,519,083 A | 5/1996 | Ashton et al. | |
| 6,531,261 B1 | 3/2003 | Usami et al. | |
| 6,874,262 B2 * | 4/2005 | Nishiyama et al. | 40/321 |
| 6,894,114 B2 | 5/2005 | Kato et al. | |
| 2001/0036594 A1 | 11/2001 | Kozawa et al. | |
| 2002/0177070 A1 | 11/2002 | Kozawa et al. | |
| 2004/0264019 A1 * | 12/2004 | Curtiss et al. | 360/15 |
| 2005/0083597 A1 * | 4/2005 | Gauzner et al. | 360/17 |
| 2005/0256218 A1 | 11/2005 | Lachowicz et al. | |
| 2006/0002021 A1 * | 1/2006 | Li et al. | 360/126 |
| 2006/0051698 A1 | 3/2006 | Miyoshi et al. | |
| 2006/0145373 A1 | 7/2006 | Kiyono et al. | |
| 2006/0263723 A1 | 11/2006 | Kozawa et al. | |
| 2006/0279025 A1 | 12/2006 | Heidari et al. | |
| 2007/0160937 A1 | 7/2007 | Ogino et al. | |
| 2007/0212522 A1 | 9/2007 | Heidari et al. | |
| 2008/0029931 A1 | 2/2008 | Tada et al. | |
| 2008/0152933 A1 * | 6/2008 | Mizuno et al. | 428/480 |
| 2008/0213420 A1 | 9/2008 | Sugimura et al. | |
| 2008/0237938 A1 | 10/2008 | Fukuzawa et al. | |
| 2009/0030107 A1 * | 1/2009 | Watanabe et al. | 522/171 |
| 2009/0104395 A1 | 4/2009 | Bruder et al. | |

(Continued)

FOREIGN PATENT DOCUMENTS
JP 60-074133 4/1985
(Continued)

OTHER PUBLICATIONS
Explanation of Non-English Language References.
(Continued)

*Primary Examiner* — Shamim Ahmed
(74) *Attorney, Agent, or Firm* — Knobbe Martens Olson & Bear LLP (57) ABSTRACT

According to one embodiment, a cured first ultraviolet-curing resin material layer having a first three-dimensional pattern is formed on a first principal surface of a magnetic recording medium having a central hole. A cured second ultraviolet-curing resin material layer having a second three-dimensional pattern is formed on a second principal surface opposite to the first principal surface of the magnetic recording.

6 Claims, 6 Drawing Sheets

U.S. PATENT DOCUMENTS

| | | |
|---|---|---|
| 2010/0159281 A1 | 6/2010 | Morita |
| 2010/0230383 A1 | 9/2010 | Umezawa |
| 2010/0230384 A1 | 9/2010 | Morita |
| 2010/0233514 A1 | 9/2010 | Umezawa |

FOREIGN PATENT DOCUMENTS

| | | |
|---|---|---|
| JP | 61-137240 | 6/1986 |
| JP | 63-159090 | 7/1988 |
| JP | H01-248335 | 10/1989 |
| JP | H03-059831 A | 3/1991 |
| JP | H03-069321 A | 3/1991 |
| JP | H04-059385 | 2/1992 |
| JP | H04-337307 | 11/1992 |
| JP | H04-372741 A | 12/1992 |
| JP | H05-266472 | 10/1993 |
| JP | H06-158019 A | 6/1994 |
| JP | H06-248251 A | 9/1994 |
| JP | H09-204697 | 8/1997 |
| JP | 2000-149329 | 5/2000 |
| JP | 2000-348390 | 12/2000 |
| JP | 2001-343748 A | 12/2001 |
| JP | 2001-344734 | 12/2001 |
| JP | 2004-103070 A | 4/2004 |
| JP | 2004-110896 A | 4/2004 |
| JP | 2005-122829 | 5/2005 |
| JP | 2005-166241 | 6/2005 |
| JP | 2005-166241 A | 6/2005 |
| JP | 2007-055235 A | 3/2007 |
| JP | 2007-131754 A | 5/2007 |
| JP | 2007-141370 | 6/2007 |
| JP | 2007-178724 A | 7/2007 |
| JP | 2007-186570 | 7/2007 |
| JP | 2007-186570 A | 7/2007 |
| JP | 2007-194304 A | 8/2007 |
| JP | 2008-012859 | 1/2008 |
| JP | 2008-019292 A | 1/2008 |
| JP | 2008-192250 A | 8/2008 |
| JP | 2008-251130 | 10/2008 |
| JP | 2008-274244 A | 11/2008 |

OTHER PUBLICATIONS

Notification of Reasons of Rejection mailed by Japan Patent Office on Mar. 19, 2011 in the corresponding Japanese patent application No. 2010-265030 in 7 pages.

Notification of Reasons of Rejection mailed by Japan Patent Office on Jan. 11, 2011 in the corresponding Japanese patent application No. 2009-066643 in 4 pages.

Notification of Decision of Rejection mailed by Japan Patent Office on Aug. 31, 2010 in the corresponding Japanese patent application No. 2009-066643 in 4 pages.

Notification of Reasons of Rejection mailed by Japan Patent Office on May 25, 2010 in the corresponding Japanese patent application No. 2009-066643 in 6 pages.

* cited by examiner

MAGNETIC RECORDING MEDIUM MANUFACTURING METHOD

CROSS-REFERENCE TO RELATED APPLICATIONS

This application is based upon and claims the benefit of priority from Japanese Patent Application No. 2009-066643, filed Mar. 18, 2009, the entire contents of which are incorporated herein by reference.

BACKGROUND

1. Field

One embodiment of the present invention relates to a method of manufacturing a magnetic recording medium having discrete tracks on the surface of a magnetic recording layer.

2. Description of the Related Art

Recently, the nano-imprinting techniques are attracting attention in various fields in order to further increase the density and accuracy.

For example, applications to semiconductors, optical elements, magnetic recording media, and the like are being examined.

As a magnetic recording medium, a discrete track medium is attracting attention. In this discrete track medium, magnetic interference between adjacent recording tracks is reduced by separating the adjacent tracks by grooves or guard bands made of a nonmagnetic material in order to further increase the density.

When manufacturing this discrete track medium, discrete track patterns of a magnetic layer can be formed by applying the nano-imprinting technique by using a stamper. When magnetic layer patterns corresponding to servo area signals are formed together with recording track patterns by imprinting, it is possible to obviate the servo track writing step required in the manufacture of the conventional magnetic recording media. This leads to a cost reduction.

As disclosed in Jpn. Pat. Appln. KOKAI Publication No. 2007-186570, as the process of forming discrete track patterns as described above, it is possible to use a process of transferring resist patterns from, e.g., an Ni stamper by, e.g., high-pressure imprinting or thermal imprinting. Unfortunately, this process is unsuitable for mass-production because the life of the Ni stamper is short. Also, when the data density is increased to make tracks finer, resist patterns cannot be successfully transferred.

From the foregoing, the use of optical nano-imprinting is attracting attention as another nano-imprinting technique.

To transfer patterns onto a resist on a discrete track medium by using optical nano-imprinting, a resin stamper is first duplicated from an Ni stamper (mother stamper) by injection molding, and contacted in a vacuum to an uncured ultraviolet-curing resin layer to be used as a resist. This method is found to be able to reduce the cost and is suitable for micropatterning.

The characteristics required of the ultraviolet-curing resin to be transferred onto the above-mentioned discrete track medium can be given by the resistance against etching for processing transferred patterns in addition to the property of coating onto the medium, the viscosity, the hardness, the property of separation from the resin stamper, and the cure shrinkage.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a magnetic recording medium manufacturing method is provided, which includes a cured first ultraviolet-curing resin material layer having a first three-dimensional pattern is formed on a first principal surface of a magnetic recording medium having a central hole, a cured second ultraviolet-curing resin material layer having a second three-dimensional pattern on a second principal surface opposite to the first principal surface of the magnetic recording medium, and three-dimensional patterns are formed on the two surfaces of magnetic recording layers by performing dry etching by using the cured first and second ultraviolet-curing resin material layers as masks, thereby forming discrete patterns on the two surfaces of the magnetic recording medium.

This method comprises steps of forming a first coating layer of an uncured ultraviolet-curing resin material for pattern transfer on a first three-dimensional pattern surface of a first resin stamper having a central hole, contacting, in a vacuum, the first three-dimensional pattern surface of the first resin stamper and a surface of a magnetic recording layer on a first principal surface of a magnetic recording medium including a data area and a servo area with the first coating layer of the uncured ultraviolet-curing resin material for pattern transfer formed on the first three-dimensional pattern surface being interposed between the first three-dimensional pattern surface and the surface of the magnetic recording layer, curing the first coating layer of the uncured ultraviolet-curing resin material by irradiating the first coating layer with ultraviolet rays, thereby forming a cured first ultraviolet-curing resin material layer having a first three-dimensional pattern on the first principal surface of the magnetic recording medium, forming a second coating layer of an uncured ultraviolet-curing resin material for pattern transfer on a second three-dimensional pattern surface of a second resin stamper having a central hole, contacting, in a vacuum, the second three-dimensional pattern surface of the second resin stamper and a surface of a magnetic recording layer on a second principal surface opposite to the first principal surface with the second coating layer of the uncured ultraviolet-curing resin material for pattern transfer formed on the second three-dimensional pattern surface being interposed between the second three-dimensional pattern surface and the surface of the magnetic recording layer, curing the second coating layer of the uncured ultraviolet-curing resin material by irradiating the second coating layer with ultraviolet rays, thereby forming a cured second ultraviolet-curing resin material layer having a second three-dimensional pattern on the second principal surface of the magnetic recording medium, separating the first resin stamper and the second resin stamper, and forming three-dimensional patterns on the two surfaces of the magnetic recording layers by performing dry etching by using the cured first ultraviolet-curing resin material layer and the cured second ultraviolet-curing resin material layer as masks.

An outline of the pattern transfer method to be used in the present invention will be explained below with reference to FIGS. 1A to 1D.

Figure 1A:
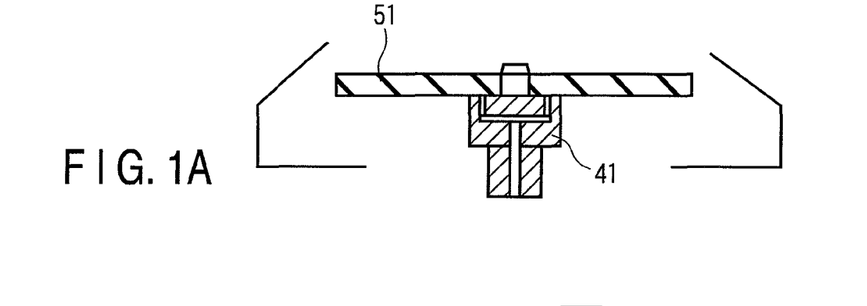
FIGS. 1A, 1B, 1C, and 1D are views showing an example of a pattern transfer method to be used in the present invention.
Figure 1B:
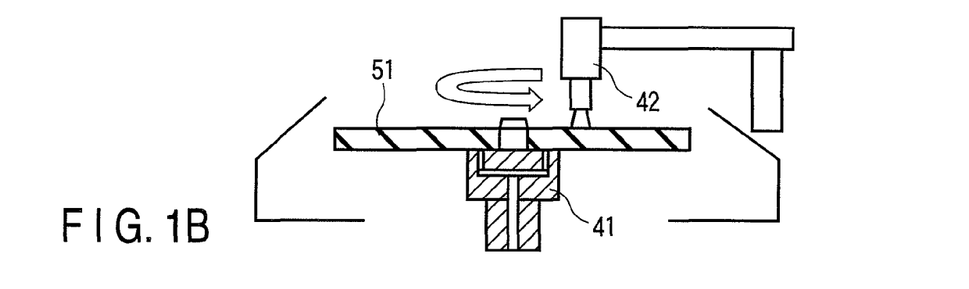
Figure 1C:
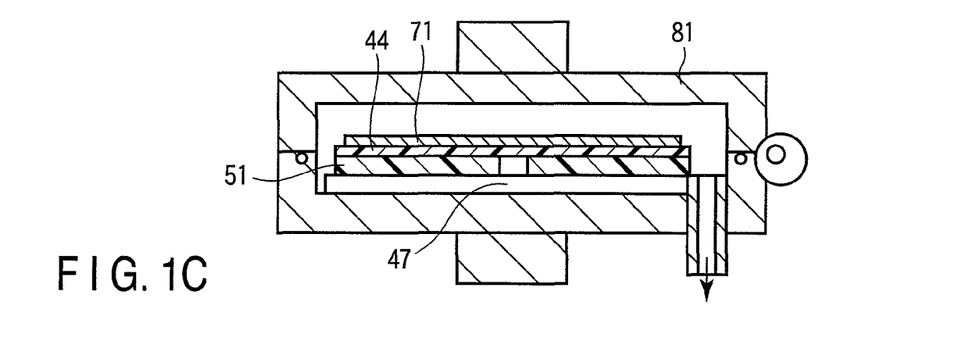
Figure 1D:
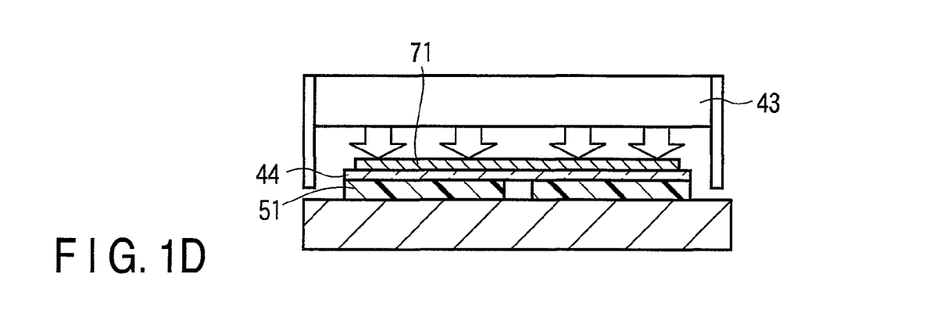

FIGS. 1A to 1D illustrate the transfer of patterns onto one surface of a medium substrate. As shown in FIG. 1A, a first resin stamper 51 is set on a spinner 41 such that a first three-dimensional pattern surface of the first resin stamper 51 faces up. As shown in FIG. 1B, while the first resin stamper 51 is spun together with the spinner 41, an ultraviolet-curing resin (2P resin) is dropped from a dispenser 42 and spin-coated. As shown in FIG. 1C, in a vacuum chamber 81, the first three-dimensional pattern of the first resin stamper 51 and a first principal surface of a magnetic recording medium 71 are contacted in a vacuum with a 2P resin layer 44 interposed between them. As shown in FIG. 1D, the first 2P resin layer 44 is cured by emitting UV radiation from a UV light source 43 through the transparent stamper 51 at atmospheric pressure.

Subsequently, following the same procedures as in FIGS. 1A and 1B except that a second stamper is used instead of the first stamper, the ultraviolet-curing resin (2P resin) is dropped from the dispenser 42 and spin-coated while a second resin stamper 52 is spun.

Figure 2A:
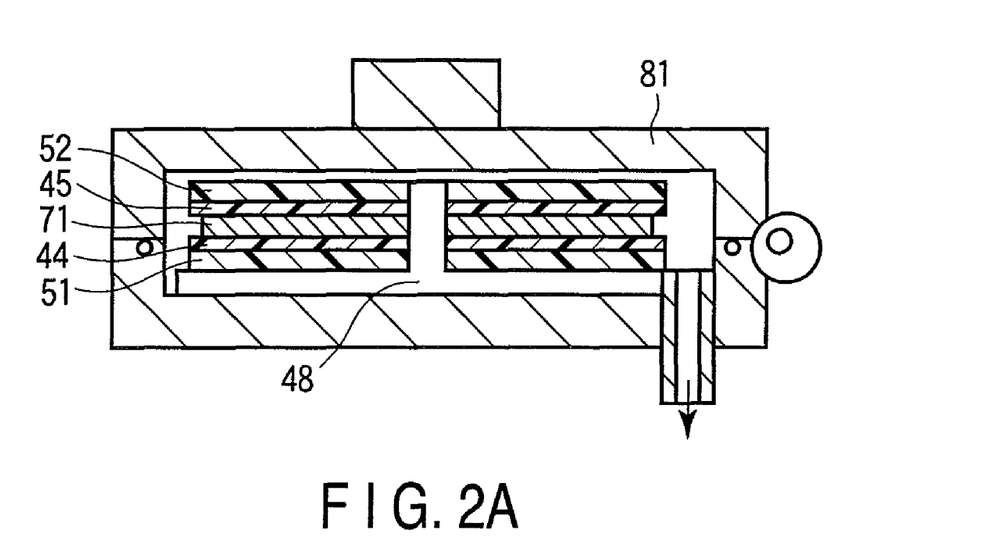
FIGS. 2A and 2B are views showing the example of the pattern transfer method to be used in the present invention.

After that, as shown in FIG. 2A, in the vacuum chamber 81, a second three-dimensional pattern of the second resin stamper 52 and a second principal surface opposite to the first principal surface of the magnetic recording medium 71 are contacted in a vacuum with a 2P resin layer 45 being interposed between them. In this state, the first resin stamper 51 is in tight contact with the first 2P resin layer 44 on the first principal surface.

Figure 2B:
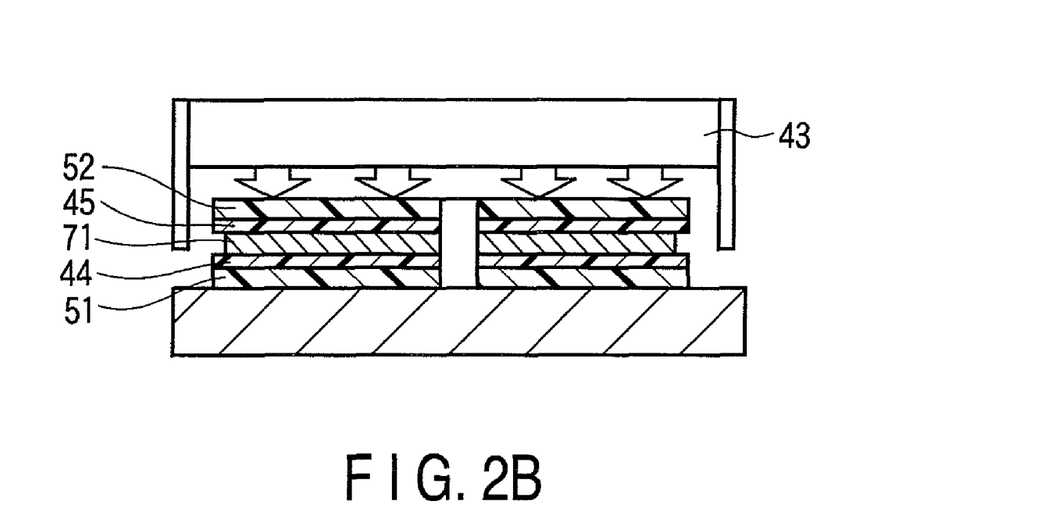

As shown in FIG. 2B, the second 2P resin layer 45 is cured by emitting UV radiation from the UV light source 43 through the transparent stamper 52 at atmospheric pressure.

After the step shown in FIG. 2B, the transparent stamper 51 is separated from the first 2P resin layer 44, and the second resin stamper 52 is separated from the second 2P resin layer 45.

When the method of the present invention is used, an ultraviolet-curing resin coating layer is formed on a resin stamper and contacted to the surface of a magnetic recording medium in a vacuum, and the resin stamper is separated. Consequently, a cured ultraviolet-curing resin layer onto which good three-dimensional patterns are transferred is readily formed on the magnetic recording medium. Also, when the present invention is used, an ultraviolet-curing resin having three-dimensional patterns corresponding to discrete patterns can readily be formed with a high yield on the two surfaces of a magnetic recording medium.

The ultraviolet-curing resin to be used in the present invention will be explained below.

If an ultraviolet-curing resin material made of a monomer, oligomer, and polymerization initiator and containing no solvent is used in the magnetic recording medium manufacturing method of the present invention, the etching rate of Ar milling during dry etching processing increases, and the groove width increases after the dry etching processing. This often makes it difficult to form fine grooves.

Also, an oligomer having a large molecular weight is presumably the cause of decreasing the dry etching resistance.

As the ultraviolet-curing resin material to be used in the present invention, therefore, the use of an ultraviolet-curing resin material made of a plurality of predetermined types of monomers and a polymerization initiator and containing neither an oligomer nor a solvent has been examined.

A first monomer material to be used in the present invention desirably has a low viscosity in order to form a thin coating film. For this purpose, it is possible to use, e.g., the following monofunctional acrylates:
2-(2-ethoxyethoxy)ethyl acrylate,
Stearyl acrylate,
Octyl/decyl acrylate,
Isodecyl acrylate,
Isooctyl acrylate,
Tetrahydrofurfuryl acrylate,
Lauryl acrylate,
Tridecyl acrylate,
Isobornyl acrylate,
Alkoxylated tetrahydrofurfuryl acrylate,
2-phenoxyethyl acrylate,
Cyclic trimethylolpropaneformal acrylate, and
3,3,5-trimethylcyclohexane acrylate.

Among these acrylates, isobornyl acrylate represented by formula (1) below has an alicyclic structure, has a high etching resistance because a glass transition temperature Tg is high, and is suited to thin film formation because the viscosity is low.

(1)

Unfortunately, the property of separation from a resin stamper is often bad because the hardness after curing is high, i.e., the resin readily becomes hard, the surface tension is low, and the like.

The ultraviolet-curing resin material of the present invention is made of isobornyl acrylate favorable as the first monomer material, polyfunctional acrylate as a second monomer, adamantyl acrylate as a third monomer, and a polymerization initiator. An additive such as an adhesive may also be mixed at a ratio of or less in addition to these materials, but the quality is highest when no additive is contained.

The content of isobornyl acrylate can be 70 (inclusive) to 95 (inclusive) that of the polyfunctional acrylate can be 1 (inclusive) to 30 (inclusive) wt %, that of adamantyl acrylate can be 1 (inclusive) to 30 (inclusive) wt %, and that of the polymerization initiator can be 0.5 (inclusive) to 6 (inclusive) wt %.

When using the ultraviolet-curing resin material having the above composition, the property of separation from a resin stamper improves, so the material comes in to tight contact with the surface of a magnetic recording medium. In addition, shrinkage caused by UV curing is small. Therefore, a stamper deforms little even when exposed to UV radiation twice or more times.

The polyfunctional acrylates include bifunctional acrylate, trifunctional acrylate, and tetrafunctional and higher-order-function acrylates.
Examples of the bifunctional acrylate are:
1,3-butylene glycol diacrylate,
1,4-butanediol diacrylate,
diethylene glycol diacrylate,
1,6-hexanediol diacrylate,
neopentyl glycol diacrylate,
polyethylene glycol (200) diacrylate,
tetraethylene glycol diacrylate,
triethylene glycol diacrylate,
tripropylene glycol diacrylate,
polyethylene glycol (400) diacrylate,
ethoxylated (3) bisphenol A diacrylate,
cyclohexane dimethanol diacrylate,
dipropylene glycol diacrylate,
acrylate ester (dioxane glycol diacrylate),
alkoxylated hexanediol diacrylate,
alkoxylated cyclohexanedimethanol diacrylate,
ethoxylated (4) bisphenol A diacrylate,
ethoxylated (10) bisphenol A diacrylate,
polyethylene glycol (600) diacrylate,
tricyclodecanedimethanol diacrylate,
propoxylated (2) neopentyl glycol diacrylate,
ethoxylated (30) bisphenol A diacrylate, and
alkoxylated neopentyl glycol diacrylate.
As the trifunctional acrylate, it is possible to use, e.g.,
trimethylolpropane triacrylate,
trimethylolpropane PO-modified triacrylate,
(the number of POs (propoxy groups): 2, 3, 4, 6),
trimethylolpropane EO-modified triacrylate,
(the number of EOs (ethoxy groups): 3, 6, 9, 15, 20),
tris(2-hydroxyethyl)isocyanurate triacrylate,
pentaerythritol triacrylate,
pentaerythritol EO-modified triacrylate,
EO-modified glycerin triacrylate,
propoxylated (3) glyceryl triacrylate,
highly propoxylated (5.5) glyceryl triacrylate,
trisacryloyloxyethyl phosphate, and
ε-caprolactone-modified tris(acryloxyethyl)isocyanurate.
As the tetrafunctional and higher-order-function acrylates, it is possible to use, e.g.,
trisacryloyloxyethyl phosphate,
pentaerythritol tetraacrylate,
ditrimethylolpropane tetraacrylate,
ethoxylated (4) pentaerythritol tetraacrylate, and
dipentaerythritol pentaacrylate.

As the polyfunctional acrylate, it is possible to use at least one acrylate selected from the group consisting of
1,6-hexanediol diacrylate,
neopentyl glycol diacrylate,
ethoxylated (3) bisphenol A diacrylate,
ethoxylated (4) bisphenol A diacrylate,
ethoxylated (10) bisphenol A diacrylate,
tricyclodecanedimethanol diacrylate,
propoxylated (2) neopentyl glycol diacrylate,
ethoxylated (30) bisphenol A diacrylate,
trimethylolpropane triacrylate,
trimethylolpropane PO-modified triacrylate,
(the number of POs (propoxy groups): 2, 3, 4, 6),
trimethylolpropane EO-modified triacrylate,
(the number of EOs (ethoxy groups): 3, 6, 9, 15, 20),
tris(2-hydroxyethyl)isocyanurate triacrylate,
EO-modified glycerin triacrylate,
propoxylated (3) glyceryl triacrylate, and
highly propoxylated (5.5) glyceryl triacrylate.

As the polymerization initiator, it is possible to use, e.g., an alkylphenone-based photopolymerization initiator, acylphosphine oxide-based polymerization initiator, titanocene-based polymerization initiator, oxime ester-based photopolymerization initiator, or oxime ester acetate-based photopolymerization initiator.

Practical examples of the above polymerization initiators are 2,2-dimethoxy-1,2-diphenylethane-1-on (IRGACURE 651 manufactured by Ciba Specialty Chemicals), 1-hydroxy-cyclohexyl-phenyl-ketone (IRGACURE 184 manufactured by Ciba Specialty Chemicals), and 2-hydroxy-2-methyl-1-phenyl-propane-1-on (DAROCURE 1173 manufactured by Ciba Specialty Chemicals).

Other examples are IRGACURE 2959, IRGACURE 127, IRGACURE 907, IRGACURE 369, IRGACURE 379, DAROCURE TPO, IRGACURE 819, IRGACURE 784, IRGACURE OXE01, IRGACURE OXE02, and IRGACURE 754 (all are manufactured by Ciba Specialty Chemicals).

Isobornyl acrylate has a relatively low viscosity of 9 CP and a high Tg. Also, isobornyl acrylate has a high etching resistance because it has an alicyclic structure.

When the ultraviolet-curing resin contains only isobornyl acrylate and the polymerization initiator, the property of separation from a resin stamper is bad. The property of separation is bad even when a monofunctional monomer, a bifunctional monomer, and isobornyl acrylate are combined. When a trifunctional monomer was combined, the hardness of a cured film was sufficient while the etching resistance remained high. It is difficult to use a polyfunctional monomer having an order higher than that of a trifunctional monomer in the low-viscosity, ultraviolet-curing resin of this object because the viscosity increases.

Acrylate having an adamantyl group, i.e., so-called adamantyl acrylate also has an alicyclic structure and hence has a high etching resistance. In addition, adamantyl acrylate has a glass transition point Tg higher than that of isobornyl acrylate and is superior to isobornyl acrylate in heat resistance. However, many adamantyl acrylates normally solidify at room temperature and hence cannot be used as a component of the ultraviolet-curing resin material. The present inventors made extensive studies, and have found that the following three types of adamantyl acrylates are liquids at room temperature, and have a viscosity of 100 to 140 CP. 2-methyl-2-adamantyl acrylate represented by (2)

2-ethyl-2-adamantyl acrylate represented by (3)

1,3-adamantanedimethanol diacrylate represented by (4)

Any of the above adamantyl acrylates can be used as the ultraviolet-curing resin component.

It is necessary to select an optimal polymerization initiator in accordance with the wavelength of a lamp for use in UV irradiation. As the lamp for use in UV irradiation, it is possible to use, e.g., a high-pressure mercury lamp, metal halide lamp, or xenon flash lamp.

It is also possible to use a resist prepared by dissolving the ultraviolet-curing resin in an organic solvent. It is readily possible to decrease the viscosity of this resist prepared by dissolving the ultraviolet-curing resin in an organic solvent, and the solvent volatilizes during spin coating. This facilitates controlling the film thickness in accordance with the spin conditions, and increases the uniformity of the film thickness from the inner periphery to the outer periphery.

As the organic solvent, it is possible to use, e.g., ethyl alcohol, methyl alcohol, isopropyl alcohol, polyethylene glycol monomethyl ether acetate (PEGMEA), ethyl lactate, or anisole. When using polycarbonate as a resin stamper, polycarbonate sometimes dissolves during contacting. Polycarbonate does not dissolve when using diacetone alcohol, dibutyl ether, or fluorinated alcohol as the solvent. Especially, when using the fluorinated alcohol as the solvent, the spin coating film thickness uniformity increases, and the amount of residual solvent after spin coating is very small. Examples of the fluorinated alcohol are 2,2,3,3-tetrafluoro-1-propanol (e.g., A-5210 manufactured by Daikin Fine Chemical Laboratories: $H(CF_2)_2CH_2OH$), 2,2,3,3,4,4,5,5-octafluoro-1-pentanol (e.g., A-5410 manufactured by Daikin Fine Chemical Laboratories: $H(CF_2)_2CH_2OH$), and other fluorinated alcohols (A-1210: $F(CF_2)_2CH_2OH$, A-1420: $F(CF_2)_4$-$CH_2CH_2OH$, and A-1620: $F(CF_2)_6CH_2CH$ OH manufactured by Daikin Fine Chemical Laboratories). 2,2,3,3-tetrafluoro-1-propanol (TFP) is most favorable because the evaporation rate is high, the viscosity is low, and the solubility of the ultraviolet-curing resin is high. A small amount (about 10 wt: less) of an ultraviolet-curing resin stock solution is dissolved in the solvent. This dissolution can be performed by using agitation, an ultrasonic wave method, or the like.

Examples of a magnetic disk substrate usable in the present invention are a glass substrate, an Al-based alloy substrate, a ceramic substrate, a carbon substrate, an Si single-crystal substrate having an oxidized surface, and a substrate obtained by forming an NiP layer on the surface of any of these substrates. As the glass substrate, amorphous glass or crystallized glass can be used. Examples of the amorphous glass are soda lime glass and alumino silicate glass. An example of the crystallized glass is lithium-based crystallized glass. As the ceramic substrate, it is possible to use a sintered product mainly containing aluminum oxide, aluminum nitride, or silicon nitride, or a material formed by fiber-reinforcing the sintered product. Plating or sputtering is used to form the NiP layer on the substrate surface.

When manufacturing a perpendicular magnetic recording medium, a so-called perpendicular double-layered medium can be formed by forming a perpendicular magnetic recording layer on a soft magnetic underlayer (SUL) on a substrate. The soft magnetic underlayer of the perpendicular double-layered medium passes a recording magnetic field from a recording magnetic pole, and returns the recording magnetic field to a return yoke placed near the recording magnetic pole. That is, the soft magnetic underlayer performs a part of the function of a recording head; the soft magnetic underlayer applies a steep perpendicular magnetic field to the recording layer, thereby increasing the recording efficiency.

An example of the soft magnetic underlayer usable in the present invention is a high-k material containing at least one of Fe, Ni, and Co. Examples of the material are FeCo-based alloys such as FeCo and FeCoV, FeNi-based alloys such as FeNi, FeNiMo, FeNiCr, and FeNiSi, FeAl-based and FeSi-based alloys such as FeAl, FeAlSi, FeAlSiCr, FeAlSiTiRu, and FeAlO, FeTa-based alloys such as FeTa, FeTaC, and FeTaN, and FeZr-based alloys such as FeZrN.

As the soft magnetic underlayer, it is also possible to use a material having a microcrystal structure such as FeAlO, FeMgO, FeTaN, or FeZrN containing 60 a or more of Fe, or a granular structure in which fine crystal grains are dispersed in a matrix.

As another material of the soft magnetic underlayer, it is possible to use a Co alloy containing Co and at least one of Zr, Hf, Nb, Ta, Ti, and Y. The content of Co can be 80 at % or more. An amorphous layer is readily formed when a film of the Co alloy is formed by sputtering. The amorphous soft magnetic material has none of magnetocrystalline anisotropy, a crystal defect, and a grain boundary, and hence has superb soft magnetism. It is also possible to reduce the noise of the medium by using the amorphous soft magnetic material. Favorable examples of the amorphous soft magnetic material are CoZr-based, CoZrNb-based, and CoZrTa-based alloys.

Another underlayer may also be formed below the soft magnetic underlayer in order to improve the crystallinity of the soft magnetic underlayer or improve the adhesion to the substrate. As the underlayer material, it is possible to use Ti, Ta, W, Cr, Pt, an alloy containing any of these materials, or an oxide or nitride of any of these materials.

An interlayer made of a nonmagnetic material can be formed between the soft magnetic underlayer and perpendicular magnetic recording layer. The interlayer interrupts the exchange coupling interaction between the soft magnetic underlayer and recording layer, and controls the crystallinity of the recording layer. As the interlayer material, it is possible to use Ru, Pt, Pd, W, Ti, Ta, Cr, Si, an alloy containing any of these materials, or an oxide or nitride of any of these materials.

To prevent spike noise, it is possible to divide the soft magnetic underlayer into a plurality of layers, and antiferromagnetically couple these layers with 0.5- to 1.5-nm thick Ru films sandwiched between them. Also, the soft magnetic layer can be coupled by exchange coupling with a hard magnetic film having in-plane anisotropy such as CoCrPt, SmCo, or FePt, or a pinning layer made of an antiferromagnetic material such as IrMn or PtMn. To control the exchange coupling force, a magnetic layer such as a Co layer or a nonmagnetic layer such as a Pt layer can be stacked above and below the Ru layer.

As the perpendicular magnetic recording layer usable in the present invention, it is possible to use a material mainly containing Co, containing at least Pt, containing Cr as needed, and further containing an oxide (e.g., silicon oxide or titanium oxide). In this perpendicular magnetic recording layer, the magnetic crystal grains can form a pillar structure. In the perpendicular magnetic recording layer having this structure, the orientation and crystallinity of the magnetic crystal grains are favorable. As a consequence, a signal/noise ratio (S/N ratio) suitable for high-density recording can be obtained. The amount of oxide is important to obtain the above structure. The content of the oxide can be 3 (inclusive) to (inclusive) mol, and can also be 5 (inclusive) to 10 (inclusive) mol, with respect to the total amount of Co, Pt, and Cr. When the content of the oxide in the perpendicular magnetic recording layer falls within the above range, the oxide deposits around the magnetic grains, so the magnetic grains can be isolated and downsized. If the content of the oxide exceeds the above range, the oxide remains in the magnetic grains and deteriorates the orientation and crystallinity of the magnetic grains. Furthermore, the oxide deposits above and below the magnetic grains. Consequently, the magnetic grains often do not form any pillar structure vertically extending through the perpendicular magnetic recording layer. On the other hand, if the content of the oxide is less than the above range, the magnetic grains are insufficiently isolated and downsized. As a result, noise increases in recording and reproduction, and this often makes it impossible to obtain a signal/noise ratio (S/N ratio) suited to high-density recording.

The content of Pt in the perpendicular magnetic recording layer can be 10 (inclusive) to 25 (inclusive) at %. When the Pt content falls within the above range, a uniaxial magnetic anisotropy constant Ku necessary for the perpendicular magnetic recording layer is obtained. In addition, the crystallinity and orientation of the magnetic grains improve. Consequently, a thermal decay characteristic and recording/reproduction characteristic suited to high-density recording are obtained. If the Pt content exceeds the above range, a layer having the fcc structure is formed in the magnetic grains, and the crystallinity and orientation may deteriorate. On the other hand, if the Pt content is less than the above range, it is often impossible to obtain Ku, i.e., a thermal decay characteristic suitable for high-density recording.

The content of Cr in the perpendicular magnetic recording layer can be 0 (inclusive) to 16 (inclusive) at %, and can also be 10 (inclusive) to 14 (inclusive) at %. When the Cr content falls within the above range, it is possible to maintain high magnetization without decreasing the uniaxial magnetic anisotropy constant Ku of the magnetic grains. Consequently, a recording/reproduction characteristic suited to high-density recording and a sufficient thermal decay characteristic are obtained. If the Cr content exceeds the above range, the thermal decay characteristic worsens because Ku of the magnetic grains decreases. In addition, the crystallinity and orientation of the magnetic grains worsen. As a consequence, the recording/reproduction characteristic tends to worsen.

The perpendicular magnetic recording layer can contain one or more additive elements selected from B, Ta, Mo, Cu, Nd, W, Nb, Sm, Tb, Ru, and Re, in addition to Co, Pt, Cr, and the oxide. These additive elements can promote the downsizing of the magnetic grains, or improve the crystallinity and orientation of the magnetic grains. This makes it possible to obtain a recording/reproduction characteristic and thermal decay characteristic more suitable for high-density recording. The total content of these additive elements can be 8 or less. If the total content exceeds 8 at, a phase other than the hcp phase is formed in the magnetic grains, and this disturbs the crystallinity and orientation of the magnetic grains. As a result, it is often impossible to obtain a recording/reproduction characteristic and thermal decay characteristic suited to high-density recording.

Other examples of the material of the perpendicular magnetic recording layer are a CoPt-based alloy, a CoCr-based alloy, a CoPtCr-based alloy, CoPtO, CoPtCrO, CoPtSi, and CoPtCrSi. As the perpendicular magnetic recording layer, it is also possible to use a multilayered film containing Co and an alloy mainly containing at least one element selected from the group consisting of Pt, Pd, Rh, and Ru. It is further possible to use a multilayered film such as CoCr/PtCr, CoB/PdB, or CoO/RhO obtained by adding Cr, B, or O to each layer of the former multilayered film.

The thickness of the perpendicular magnetic recording layer can be 5 to 60 nm, and can also be 10 to 40 nm. A perpendicular magnetic recording layer having a thickness falling within this range is suited to a high recording density. If the thickness of the perpendicular magnetic recording layer is less than 5 nm, the reproduction output becomes too low, so the noise component often becomes higher than the reproduction output. On the other hand, if the thickness of the perpendicular magnetic recording layer exceeds 40 nm, the reproduction output becomes too high and tends to distort the waveform. The coercive force of the perpendicular magnetic recording layer can be 237,000 A/m (3,000Oe) or more. If the coercive force is less than 237,000 A/m (3,000Oe), the thermal decay resistance tends to decrease. The perpendicular squareness ratio of the perpendicular magnetic recording layer can be 0.8 or more. If the perpendicular squareness ratio is less than 0.8, the thermal decay resistance often decreases.

A protective layer can be formed on the perpendicular magnetic recording layer.

The protective layer prevents the corrosion of the perpendicular magnetic recording layer, and also prevents damage to the medium surface when a magnetic head comes in contact with the medium. Examples of the material of the protective layer are materials containing C, $SiO_2$, and $ZrO_2$. The thickness of the protective layer can be 1 to 10 nm. When the thickness of the protective layer falls within the above range, the distance between the head and medium can be decreased. This is suitable for high-density recording.

The surface of the perpendicular magnetic recording medium can be coated with a lubricant, e.g., perfluoropolyether, fluorinated alcohol, or fluorinated carboxylic acid.

Figure 3:
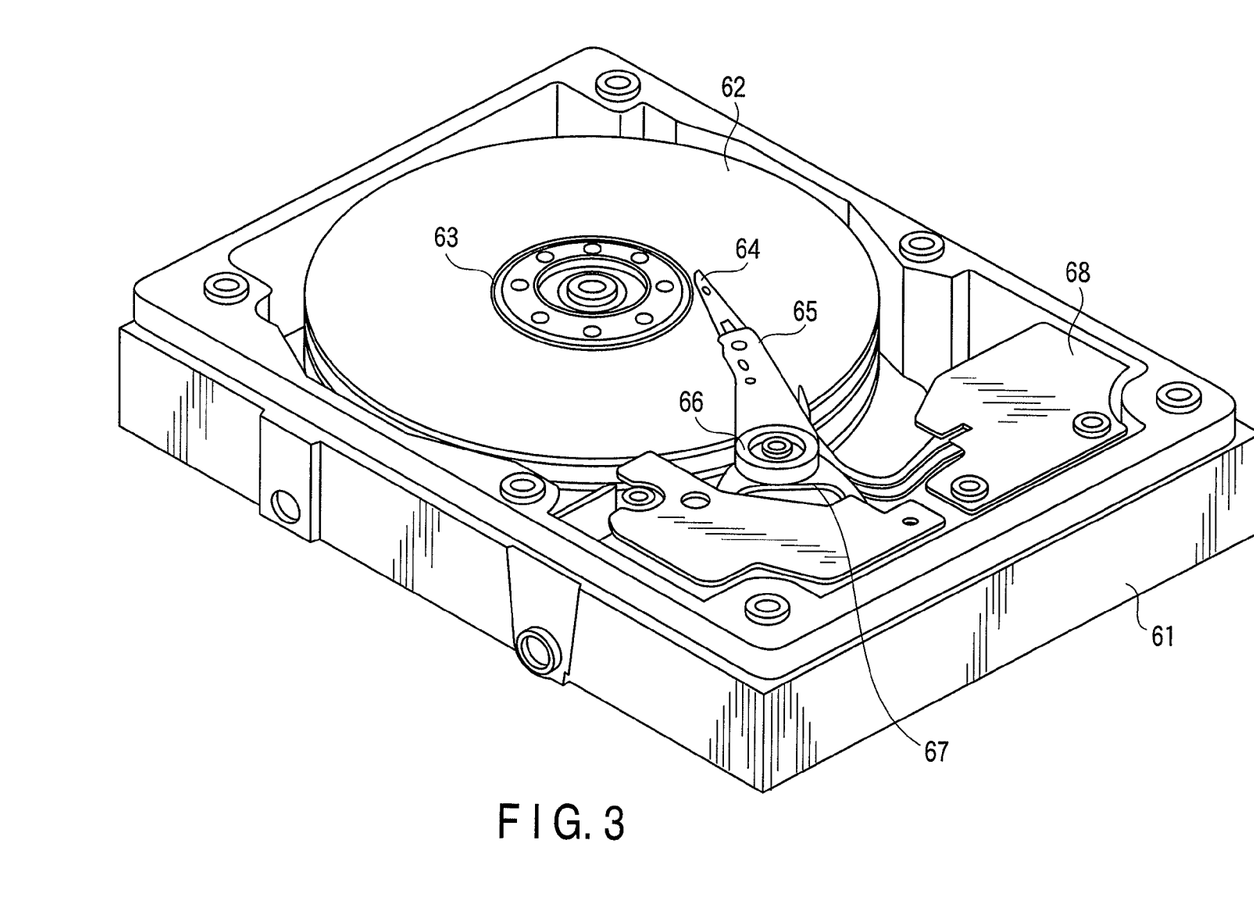
FIG. 3 is a perspective view showing a magnetic recording/reproduction apparatus that performs recording and reproduction on a magnetic recording medium.

FIG. 3 is a view showing a magnetic recording/reproduction apparatus for performing recording and reproduction on the magnetic recording medium.

This magnetic recording apparatus includes, in a housing 61, a magnetic recording medium 62, a spindle motor 63 for rotating the magnetic recording medium 62, a head slider 64 including a recording/reproduction head, a head suspension assembly (a suspension 65 and actuator arm 66) for supporting the head slider 64, a voice coil motor 67, and a circuit board.

The magnetic recording medium 62 is attached to and rotated by the spindle motor 63, and various digital data are recorded by the perpendicular magnetic recording method. The magnetic head incorporated into the head slider 64 is a so-called composite head, and includes a write head having a single-pole structure and a read head using a GMR film or TMR film. The suspension 65 is held at one end of the actuator arm 66, and supports the head slider 64 so as to oppose it to the recording surface of the magnetic recording medium 62. The actuator arm 66 is attached to a pivot 68. The voice coil motor 67 is formed as an actuator at the other end of the actuator arm 64. The voice coil motor 67 drives the head suspension assembly to position the magnetic head in an arbitrary radial position of the magnetic recording medium 62. The circuit board includes a head IC, and generates a voice coil motor driving signal, and control signals for controlling reading and writing of the magnetic head.

An address signal and the like can be reproduced from the processed magnetic recording medium by using this magnetic disk apparatus.

A magnetic disk in which the track density was 325 kTPI (Track Per Inch, equivalent to a track pitch of 78 nm) in a data zone having a radius of 9 to 22 mm was manufactured by using the method of the present invention.

To manufacture the magnetic disk having this servo area, imprinting is performed using a stamper having three-dimensional patterns corresponding to magnetic layer patterns on the magnetic disk. Note that the surface of the three-dimensional patterns of the magnetic layer formed by imprinting and subsequent processing may also be planarized by burying a nonmagnetic material in recesses.

A method of manufacturing the magnetic disk of this embodiment will be explained below.

First, a stamper was manufactured.

An Si wafer having a diameter of 6 inches was prepared as a substrate of a master as a template of the stamper. On the other hand, resist ZEP-520A available from ZEON was diluted to ½ with anisole, and the solution was filtered through a 0.05-μm filter. The Si wafer was spin-coated with the resist solution and prebaked at 200° C. for 3 min, thereby forming a resist layer about 50 nm thick.

An electron beam lithography system having a ZrO/W thermal field emission type electron gun emitter was used to directly write desired patterns on the resist onto the Si wafer at an acceleration voltage of 50 kV. This lithography was performed using a signal source that synchronously generates signals for forming servo patterns, burst patterns, address patterns, and track patterns, signals to be supplied to a stage driving system (a so-called X-θ stage driving system including a moving mechanism having a moving axis in at least one direction and a rotating mechanism) of the lithography system, and an electron beam deflection control signal. During the lithography, the stage was rotated at a CLV (Constant Linear Velocity) of 500 mm/s, and moved in the radial direction as well. Also, concentric track areas were written by deflecting the electron beam for every rotation. Note that the feeding speed was 7.8 nm per rotation, and one track (equivalent to one address bit width) was formed by ten rotations.

The resist was developed by dipping the Si wafer in ZED-N50 (available from ZEON) for 90 sec. After that, the Si wafer was rinsed as it was dipped in ZMD-B (available from ZEON) for 90 sec, and dried by air blow. In this way, a resist master (not shown) was manufactured.

A conductive film made of Ni was formed on the resist master by sputtering. More specifically, pure nickel was used as a target. After a chamber was evacuated to 8×10⁻³ Pa, the pressure was adjusted to 1 Pa by supplying argon gas, and sputtering was performed in the chamber for 40 sec by applying a DC power of 400 W, thereby forming a conductive film about 10 nm thick.

The resist master having this conductive film was dipped in a nickel sulfamate plating solution (NS-160 available from Showa Chemical Industry), and Ni electroforming was performed for 90 min, thereby forming an electroformed film about 300 μm thick. The electroforming bath conditions were as follows.

Electroforming Bath Conditions
Nickel sulfamate: 600 g/L
Boric acid: 40 g/L
Surfactant (sodium lauryl sulfate): 0.15 g/L
Solution temperature: 55° C.
pH: 4.0
Current density: 20 A/dm²

The electroformed film and conductive film were separated together with the resist residue from the resist master. The resist residue was removed by oxygen plasma ashing. More specifically, plasma ashing was performed for 20 min by applying a power of 100 W in a chamber in which the pressure was adjusted to 4 Pa by supplying oxygen gas at 100 mL/min.

Figure 4A:
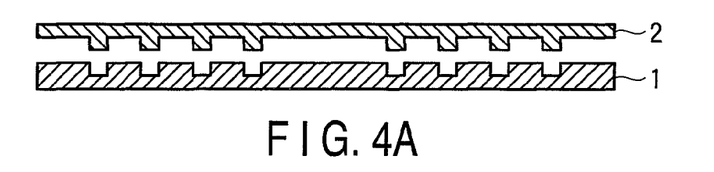
FIGS. 4A, 4B, 4C, 4D, and 4E are views showing an example of a discrete magnetic recording medium manufacturing method.
Figure 4B:
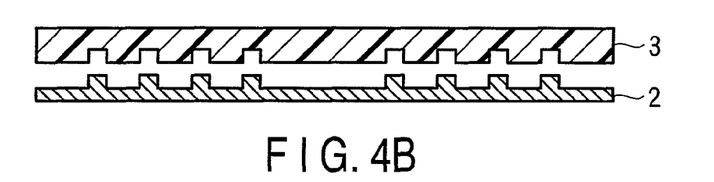

As shown in FIG. 4A, a first father stamper 1 including the conductive film and electroformed film as described above and to be used to form discrete track Patterns on a first principal surface of a magnetic recording medium was obtained. After that, electroforming was further performed to duplicate a first mother stamper 2 as shown in FIG. 4B. An injection molding stamper was obtained by removing unnecessary portions of the first mother stamper 2 by a metal blade.

A second resin stamper 3 was duplicated from the first mother stamper 2 by using an injection molding apparatus manufactured by TOSHIBA MACHINE. As the molding material, cyclic olefin polymer ZEONOR1060R available from ZEON was used. However, polycarbonate material AD5503 available from TEIJIN CHEMICALS may also be used.

Similarly, a second father stamper, second mother stamper, and second resin stamper to be used to form discrete track patterns on a second principal surface of the magnetic recording medium were obtained.

Then, a magnetic disk was manufactured.

Magnetic recording layers 5 and 5' were respectively formed by sputtering on first and second principal surfaces of a disk substrate 4 made of donut-like glass 1.8 inches in diameter. Three-nm thick metal mask layers 6 and 6' were respectively stacked on the magnetic recording layers 5 and 5'. Examples of a metal usable as the metal mask layers are Ag, Al, Au, C, Cr, Cu, Ni, Pt, Pd, Ru, Si, Ta, Ti, Zn, and alloys (e.g., CrTi, CoB, CoPt, CoZrNb, NiTa, NiW, Cr—N, SiC, and $TiO_X$) containing these metals. Among these metals, Si and Cu are superior in property of separation from a resin stamper and processability. The film thickness of the metal mask layer is determined by the processability, and preferably as small as possible. In this embodiment, a 3-nm thick Cu layer was stacked on the magnetic recording layer.

The first resin stamper was spin-coated with a resist 7 made of an ultraviolet-curing resin material at a rotational speed of 10,000 rpm.

Figure 4C:
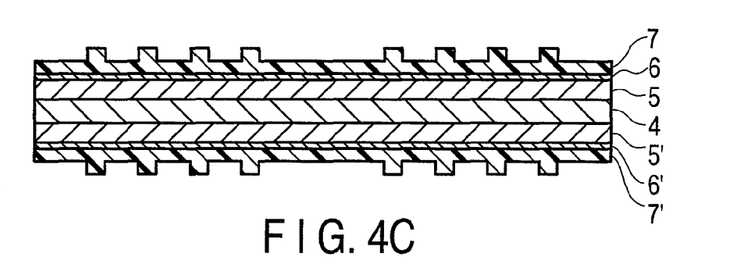

Subsequently, the first resin stamper was contacted to the first principal surface of the disk substrate by vacuum contacting with the ultraviolet-curing resin resist 7 being interposed between them, and the resin was cured by ultraviolet radiation. After that, the second resin stamper was spin-coated with a resist 7' made of an ultraviolet-curing resin material at a rotational speed of 10,000 rpm. Then, the second resin stamper was contacted to the second principal surface of the disk substrate by vacuum contacting with the ultraviolet-curing resin resist 7' interposed between them, and the resin was cured by ultraviolet radiation. After that, the first resin stamper was separated from the ultraviolet-curing resin resist 7, and the second resin stamper was separated. As shown in FIG. 4C, resist cured layers made of the ultraviolet-curing resin material were thus formed on the two surfaces of the magnetic recording medium.

In a three-dimensional pattern formation process performed by ultraviolet imprinting, the resist residue remains on the bottoms of pattern recesses.

Figure 4D:
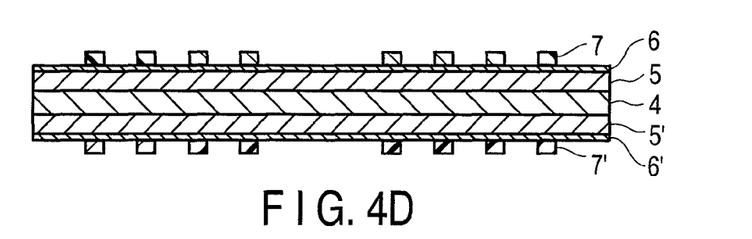
Figure 4E:
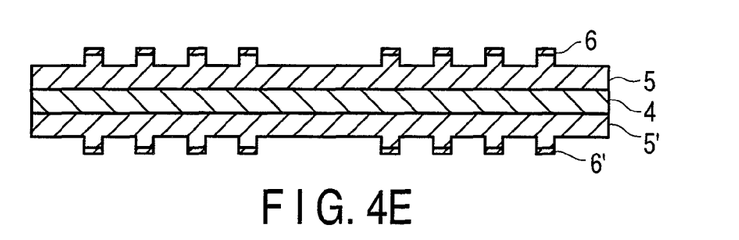

Then, the resist residue on the bottoms of pattern recesses was removed by RIE using oxygen gas. As shown in FIG. 4D, the patterns of the resist 7 were used as masks to etch the magnetic recording layer by Ar ion milling. Subsequently, as shown in FIG. 4E, the resist patterns were removed by oxygen RIE. In addition, a carbon protective layer (not shown) was formed on the entire surface. After that, the manufactured magnetic disk was coated with a lubricant.

In the magnetic disk medium described above, the magnetic recording layer was etched to the bottom in a portion where no resist mask was formed. However, it is also possible to stop Ar ion milling halfway to obtain a medium having projections and recesses. Alternatively, it is possible to obtain a medium by imprinting a stamper onto a resist on a substrate without initially forming any magnetic layer, giving a three-dimensional structure to the substrate shape by etching or the like, and then forming a magnetic film. Furthermore, in any medium including the above-mentioned media, the grooves may also be filled with a certain nonmagnetic material.

EXAMPLES

The present invention will be explained in detail below by way of its examples.

In this example, for a 1.8-inch magnetic recording medium, a magnetic recording material medium has a central hole diameter (inner diameter) of 12.01 mm, an outer diameter of 48 mm, and a thickness of 0.508 mm, and an upper side resin stamper has an inner diameter of 7 mm, an outer diameter of 75 mm, and a thickness of 0.6 mm. A lower side resin stamper has the same size as that of the upper side resin stamper. When the inner diameter of the upper side resin stamper is as small as, e.g., 4 or 5 m, separation from the two sides is further facilitated.

For a 2.5-inch magnetic recording medium, a magnetic recording material medium has an inner diameter of 20.01 mm, an outer diameter of 65 mm, and a thickness of 0.635 mm, and an upper side resin stamper has an inner diameter of 7 mm, an outer diameter of 75 mm, and a thickness of 0.6 mm.

A lower side resin stamper has an inner diameter of 12.01 mm, an outer diameter of 75 mm, and a thickness of 0.6 mm. The inner diameters of the upper and lower side resin stampers may also be the same. This is convenient because the same injection mold can be used.

In the same manner as in the steps shown in FIGS. 1A to 1D, a magnetic recording medium surface 71 was contacted in a vacuum to an ultraviolet-curing resin resist 44 on the pattern surface of an upper side resin stamper 51, and the resin was cured by ultraviolet radiation. This contacting was performed by aligning the inner diameters of the upper side resin stamper and magnetic recording medium by a center pin 47 in order to perform eccentric alignment.

In addition, the lower side pattern surface of a lower side resin stamper was spin-coated with an ultraviolet-curing resin. The rotational speed was 10,000. Note that the ultraviolet-curing resin used contained 30 parts by weight of isobornyl acrylate, 59 parts by weight of trimethylolpropane triacrylate as polyfunctional acrylate, 10 parts by weight of 2-methyl-2-adamantyl acrylate as adamantyl acrylate, and 1 part by weight of IRGACURE 396: 2-benzyl-2-dimethylamino-1-(4-morpholinophenyl)-butanone-1 as a polymerization initiator.

Then, as shown in FIGS. 2A and 2B, the lower side of the magnetic recording medium 71 was contacted to an ultraviolet-curing resin resist 45 on the pattern surface of a lower side resin stamper 52 by vacuum contacting, and the resin was cured by ultraviolet radiation. This contacting was performed by aligning the inner diameters of the lower side resin stamper 52 and upper side resin stamper 51 by a center pin 48 in order to perform eccentric alignment.

FIGS. 5A to 5F are views showing an example of a resin stamper separating process.

As shown in FIGS. 5A to 5F, the upper side resin stamper 51 was separated by a separating member 49 having a pawl push-up portion. During separation, the lower side of the lower side resin stamper 51 can be held by vacuum suction.

Figure 6:
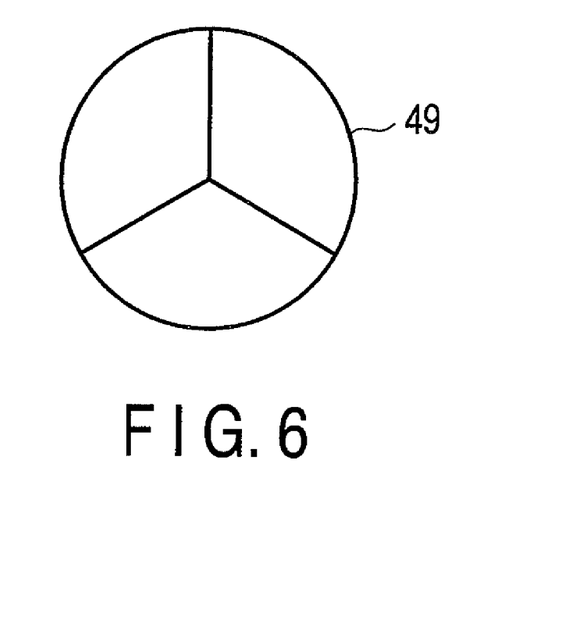
FIG. 6 is a front view of an example of a pawl push-up portion.
Figure 7:
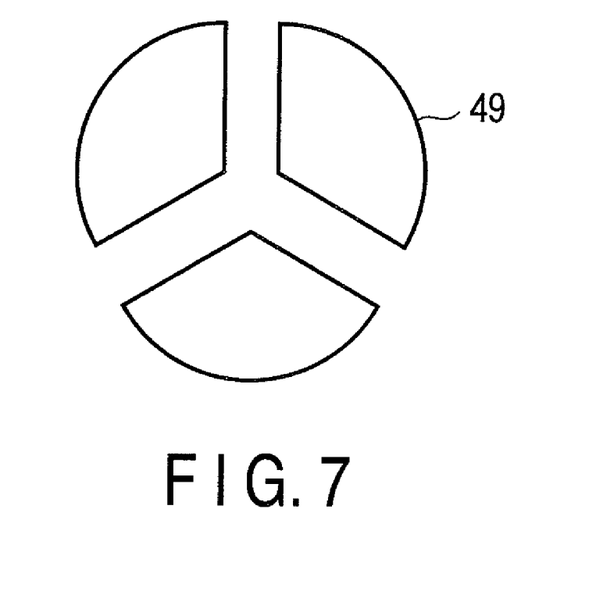
FIG. 7 is a front view of a modification of the pawl push-up portion.

FIGS. 6 and 7 illustrate examples of front views of the pawl push-up portion.

Figure 5A:
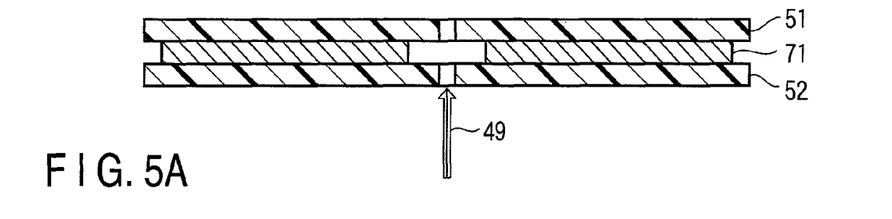
FIGS. 5A, 5B, 5C, 5D, 5E, and 5F are views showing an example of a resin stamper separating process.
Figure 5B:
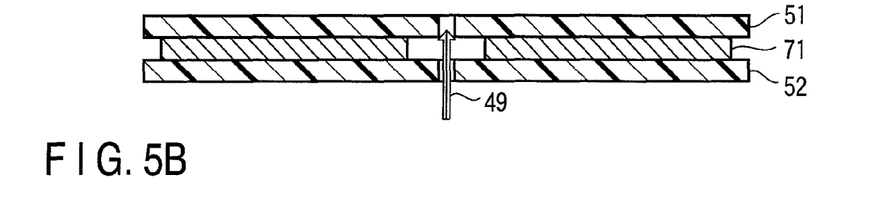
Figure 5C:
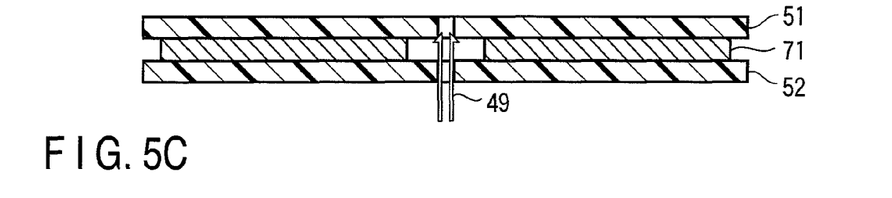
Figure 5D:
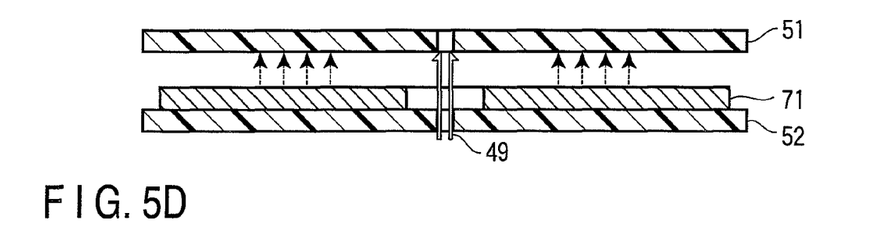

The pawl push-up portion is inserted, in a closed state as shown in FIG. 6, from the inner-diameter hole of the lower side resin stamper as shown in FIGS. 5A and 5B, and opens in three directions as shown in FIG. 7 after that. As shown in FIG. 5C, the opened pawl push-up portion pushes up and separates the upper side resin stamper 51. As shown in FIG. 5D, separation is facilitated by promoting it by spraying $N_2$ gas or air from the pawls immediately after push-up. Although not shown, separation is effectively facilitated by, e.g., raising the upper side resin stamper 51 by vacuum suction from the lower side.

Figure 5E:
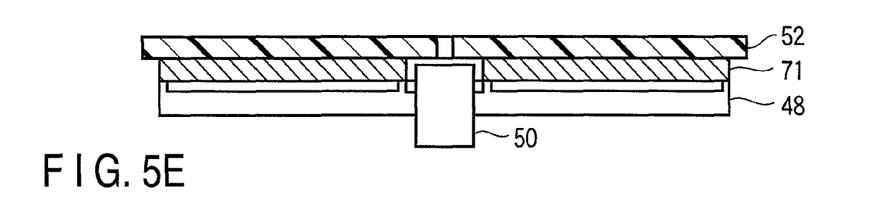
Figure 5F:
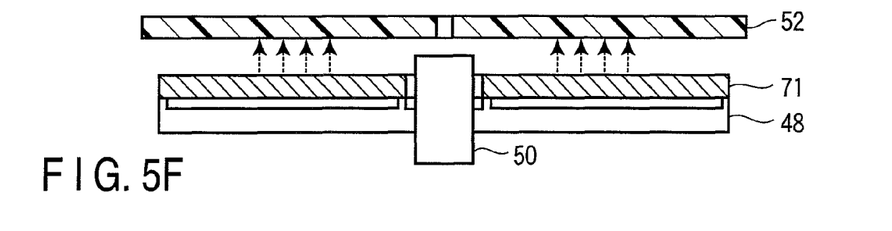

Similarly, the lower side resin stamper 52 is separated from the magnetic recording medium from which the upper side resin stamper 51 is already separated. A support member 48 holds the inner-diameter hole and peripheral edge by vacuum suction so as not to touch the upper side transferred patterns of the magnetic recording medium 71. The lower side resin stamper is separated by pushing up its inner-diameter portion by inserting the push-up portion from the inner-diameter hole of the magnetic recording medium 71. In this step, the separating device 49 having the push-up portion can be used. However, since the inner-diameter hole of the magnetic recording medium 71 is larger than the lower side resin stamper 51, the lower side resin stamper 51 can readily be pushed up by, e.g., a columnar push-up member 50, as shown in FIG. 5E. As shown in FIG. 5F, separation is facilitated by promoting it by spraying $N_2$ gas or air from the push-up portion immediately after push-up. Also, separation is effectively facilitated by, e.g., raising the lower side resin stamper 52 by vacuum suction from the lower side.

In this way, the magnetic recording medium having the ultraviolet-curing resin resist patterns transferred onto the two sides was manufactured.

In a three-dimensional pattern formation process performed by ultraviolet imprinting, the resist residue remains on the bottoms of pattern recesses.

Then, the resist residue on the bottoms of upper side pattern recesses was removed by RIE using oxygen gas. In addition, the resist residue on the bottoms of lower side pattern recesses was removed.

The patterns of the resist were used as masks to etch the metal mask layer by Ar ion milling, and the metal mask was used as a mask to etch the magnetic recording layer. Subsequently, the resist patterns were removed by oxygen RIE. In addition, a carbon protective layer was formed on the entire surface. After that, the manufactured magnetic disk was coated with a lubricant.

In the magnetic disk medium described above, the magnetic recording layer was etched to the bottom in a portion where no resist mask was formed. However, it is also possible to stop Ar ion milling halfway to obtain a medium having projections and recesses. Alternatively, it is possible to obtain a medium by imprinting a stamper onto a resist on a substrate without initially forming any magnetic layer, giving a three-dimensional structure to the substrate shape by etching or the like, and then forming a magnetic film. Furthermore, in any medium including the above-mentioned media, the grooves may also be filled with a certain nonmagnetic material.

Thus, 1,000 double-sided magnetic recording media (2,000 sides) were manufactured by the process of the present invention. Then, the primary eccentricity of each manufactured double-sided magnetic recording medium was measured by a factory microscope (manufactured by Nikon).

The results are as follows.

Side A primary eccentricity: maximal value=20 μm, minimal value=5 μm

Side B primary eccentricity: maximal value=24 μm, minimal value=8 μm

The stamper deformed little even when exposed to UV radiation twice or more times because shrinkage by UV curing was small.

Note that the ultraviolet-curing resin resist had a good property of separation from the resin stamper, and was in tight contact with the surface of the magnetic recording medium.

Note also that from the two-side vacuum contacting step to the resin stamper separating step, failures occurred for 24 sides out of 2,000 sides, and 19 disks were defective.

That is, (1000−19)/1000×100=98.1%, i.e., the total yield was as high as 98.1.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic recording medium manufacturing method comprising:
    forming a first coating layer of an uncured ultraviolet-curing resin material for pattern transfer on a first three-dimensional pattern surface of a first resin stamper comprising a central hole;
    contacting, with a vacuum applied, the first three-dimensional pattern surface of the first resin stamper and a surface of a magnetic recording layer on a first principal surface of a magnetic recording medium comprising a data area and a servo area and comprising a central hole having a larger size than a size of the central hole of the first resin stamper with the first coating layer of the uncured ultraviolet-curing resin material for pattern transfer formed on the first three-dimensional pattern surface interposed between the first three-dimensional pattern surface and the surface of the magnetic recording layer;
    curing the first coating layer of the uncured ultraviolet-curing resin material by ultraviolet irradiation, to form a cured first ultraviolet-curing resin material layer comprising a first three-dimensional pattern on the first principal surface of the magnetic recording medium;
    forming a second coating layer of an uncured ultraviolet-curing resin material for pattern transfer on a second three-dimensional pattern surface of a second resin stamper comprising a central hole having the same size as the size of the central hole of the first resin stamper;
    contacting, with a vacuum applied, the second three-dimensional pattern surface of the second resin stamper and a surface of a magnetic recording layer on a second principal surface opposite to the first principal surface with the second coating layer of the uncured ultraviolet-curing resin material for pattern transfer formed on the second three-dimensional pattern surface interposed between the second three-dimensional pattern surface and the surface of the magnetic recording layer;
    curing the second coating layer of the uncured ultraviolet-curing resin material by ultraviolet irradiation, to form a cured second ultraviolet-curing resin material layer comprising a second three-dimensional pattern on the second principal surface of the magnetic recording medium;
    separating the first resin stamper by inserting a push-up member comprising a separating pawl from the central hole in the second principal surface and pushing up the central hole of the first resin stamper, and separating the second resin stamper by inserting the push-up member from the central hole in the first principal surface and pushing up the central hole of the second resin stamper; and
    forming three-dimensional patterns on the two surfaces of the magnetic recording layers by dry etching with the cured first ultraviolet-curing resin material layer and the cured second ultraviolet-curing resin material layer as masks.

2. The method of claim 1, wherein the ultraviolet-curing resin material comprises a monofunctional acrylate, a polyfunctional acrylate, an adamantyl acrylate, and a polymerization initiator.

3. The method of claim 1, wherein the ultraviolet-curing resin material comprises:
    one of monofunctional acrylate, polyfunctional acrylate, adamantyl acrylate, and a polymerization initiator; and
    a fluorinated alcohol.

4. The method of claim 2, wherein the monofunctional acrylate is isobornyl acrylate.

5. The method of claim 2, wherein the polyfunctional acrylate is at least one acrylate selected from the group consisting of
    1,6-hexanediol diacrylate,
    neopentyl glycol diacrylate,
    ethoxylated (3) bisphenol A diacrylate,
    ethoxylated (4) bisphenol A diacrylate,
    ethoxylated (10) bisphenol A diacrylate,
    tricyclodecanedimethanol diacrylate,
    propoxylated (2) neopentyl glycol diacrylate,
    ethoxylated (30) bisphenol A diacrylate,
    trimethylolpropane triacrylate,
    trimethylolpropane PO-modified triacrylate,
    (the number of POs (propoxy groups): 2, 3, 4, 6),
    trimethylolpropane EO-modified triacrylate
    (the number of EOs (ethoxy groups): 3, 6, 9, 15, 20),
    tris(2-hydroxyethyl)isocyanurate triacrylate,
    EO-modified glycerin triacrylate,
    propoxylated (3) glyceryl triacrylate, and
    highly propoxylated (5.5) glyceryl triacrylate.

6. The method of claim 2, wherein the adamantyl acrylate is selected from the group consisting of 2-methyl-2-adamantyl acrylate, 2-ethyl-2-adamantyl acrylate, and 1,3-adamantanedimethanol diacrylate.

* * * * *